US006688036B1

(12) United States Patent
Gunn (10) Patent No.: US 6,688,036 B1
(45) Date of Patent: Feb. 10, 2004

(54) METHOD AND APPARATUS FOR CONTROLLING PESTS

(76) Inventor: John Gunn, 4501 Summerhill Rd., Apt. 150, Texarkana, TX (US) 75503

( * ) Notice: Subject to any disclaimer, the term of this patent is extended or adjusted under 35 U.S.C. 154(b) by 0 days.

(21) Appl. No.: 10/364,107

(22) Filed: Feb. 11, 2003

(51) Int. Cl.[7] .............................................. A01M 13/00
(52) U.S. Cl. ........................ 43/125; 43/132.1; 43/134; 43/138
(58) Field of Search ............................... 43/125, 132.1, 43/134, 138, 900

(56) References Cited

U.S. PATENT DOCUMENTS

| | | |
|---|---|---|
| 584,484 A | 6/1897 | Schindler |
| 3,029,558 A | 4/1962 | Odenkirk ........................ 47/1 |
| 3,625,433 A | 12/1971 | Moss et al. .................. 239/271 |
| 4,413,756 A | * 11/1983 | Kirley .................... 222/402.11 |
| 4,594,807 A | 6/1986 | McQueen .................. 43/132.1 |
| 4,624,070 A | 11/1986 | Query et al. ............... 43/132.1 |
| 4,637,161 A | 1/1987 | Turner .......................... 43/130 |
| 4,640,044 A | 2/1987 | Varnon ...................... 43/132.1 |
| 4,756,118 A | 7/1988 | Evans, II ................... 43/132.1 |
| 4,768,306 A | 9/1988 | Hilbun ......................... 43/125 |
| 4,833,818 A | 5/1989 | Berta ........................... 43/124 |
| 5,054,231 A | * 10/1991 | Witherspoon ................. 43/124 |
| 5,154,018 A | 10/1992 | Livingston ................... 43/125 |
| 5,246,675 A | 9/1993 | Castronovo ................. 422/305 |
| 5,394,643 A | 3/1995 | Schmittmann ............... 43/124 |
| 5,419,077 A | 5/1995 | Tombarelli ................. 43/132.1 |
| 5,561,942 A | 10/1996 | Mugno et al. ................ 43/129 |
| 5,881,493 A | 3/1999 | Restive ......................... 43/124 |
| 5,885,600 A | 3/1999 | Blum et al. ................. 424/405 |
| 6,205,702 B1 | 3/2001 | Ammons .................. 43/132.1 |

OTHER PUBLICATIONS

"Gordon's Indoor Fogger", Product Information Sheet, PBI/Gordon Corporation, 1217 West 12th Street, Kansas City, Missouri 64101, Feb. 21, 2002.

* cited by examiner

Primary Examiner—J. Woodrow Eldred
(74) Attorney, Agent, or Firm—Daniel W. Keene; Akin Gump Strauss Hauer & Feld, LLP (57) ABSTRACT

An apparatus includes a container of pressurized fluid formulated to eliminate pests and a housing that is adapted to sit on a surface surrounding a pest dwelling with pest entrances, thereby forming a closed interior cavity and enclosing the pest entrances. The container has a spray release mechanism including a nozzle for releasing the pressurized fluid. The container sits on the surrounding surface within the closed interior cavity. The housing includes an activation mechanism and may include a first section housing including a first section opening edge associated with a first section flexible sealing member and a second section housing including a second section opening edge associated with a second section flexible sealing member. The first section opening edge and the second section opening edge define an upper surface opening in an upper surface of the housing. The first section sealing member sealably engages the first section opening edge and a first outside surface of an interior obstruction extending upwardly from the surrounding surface through the upper surface opening, and the second section sealing member sealably engages the second section opening edge and a second outside surface of the interior obstruction, thereby sealably filling the upper surface opening. The activation mechanism is adapted to operably engage the spray release mechanism, causing the nozzle to release the pressurized fluid into the closed interior cavity and the pressurized fluid to pass through the pest entrances, infusing the pest dwelling.

27 Claims, 8 Drawing Sheets

METHOD AND APPARATUS FOR CONTROLLING PESTS

BACKGROUND OF THE INVENTION

This invention relates to a method and apparatus for controlling pests. More specifically, it relates to an effective, environmentally safe, lightweight, inexpensive, versatile, easy to operate, portable apparatus and a method of use for killing, incapacitating, or eliminating pests.

Flying, burrowing and crawling pests can be annoying, threatening or damaging to persons, property and vegetation and are particularly bothersome when they inhabit building structures or the grounds of areas inhabited by humans. Many insects, such as flies, mosquitoes, cockroaches, moths, beetles, aphids, mites and ants, as well as burrowing animals, such as mice, moles and rats, are capable of disease transmission. Nesting bees, wasps, hornets and fire ants may attack and sting farm animals, domestic animals and humans and have been know to seriously injure or kill both animals and humans. Rats, mice and termites, for example, are capable of causing extensive property damage.

Fire ants, in particular, cause over one billion dollars in damage each year in the United States. They have been known to attack, injure and cause the death of humans, farm animals and domestic animals. They also have been known to cause the degradation and deter the harvesting of crops, damage and kill plant and animal life in national and city parks, cause damage to telephone boxes and electrical transformers, deter humans from fully enjoying the yards of their homes, damage building structures and cause the interruption of utility services to buildings. Governments and private citizens in the United States spend millions of dollars each year to eradicate fire ants with limited success. Imported fire ants continue to migrate northward in the United States, expanding the area of infestation.

Apparatuses and methods for controlling pests have existed for years. Toxic chemicals often have been applied to pests' dwellings and the surrounding areas in order to exterminate the pests. While toxic chemicals can be very effective, exposing toxic chemicals to the environment is not safe for humans, animals, plants and desirable insects and therefore is often prohibited in the United States by the Environmental Protection Agency. Methods and apparatuses for applying freezing liquids, steam, intense heat, intensified solar radiation, anesthetics, foams, chemical fogs generated onsite, carbon monoxide, carbon dioxide and other heavier-than-air gases have also been used to control pests. An apparatus for flushing and vacuuming has been developed to remove pests from their dwelling places by injecting a flushing agent into the dwelling and vacuuming out the flushing agent together with the pests. The use of such apparatuses and methods to exterminate pests also can be effective, but they generally require special chemicals that are expensive and not readily available or special equipment that may be expensive, relatively heavy, relatively immobile, and not readily available.

Many of the apparatuses that have been developed utilize a hood or shroud that covers and encloses the surface surrounding the pests' dwelling for application of the exterminating agent(s). The versatility of such apparatuses is limited, however, because oftentimes the pests' dwelling may be located adjacent an obstruction such as a tree, a fence post, a telephone pole, a light pole, a lamp post, an air conditioner or an electrical device used in the provision of electricity or telephone service, and the hood or shroud may not cover the entire surrounding surface of the pests' dwelling.

Other apparatuses and methods have been developed for specialized use in controlling pests. A specialized apparatus has been developed for exterminating insects in walls and ceilings of buildings using a disposable aerosol insecticide spraying canister, but the apparatus is designed only for the control of pests that inhabit buildings through insertion into an opening in a wall or ceiling. Additionally, conventional aerosol foggers have long been used in one or more enclosed rooms in buildings for eliminating pests such as fleas and ticks but generally have not been used to infuse outside pest dwellings such as ant hills, wasp nests, and so on. Such conventional aerosol foggers have, however, been used outside for releasing insecticides into the air for eliminating flying pests such as mosquitoes. Such applications, however, do not eliminate pests from their dwelling places and may be harmful to the environment.

Further, granules of solid insecticide have been used to exterminate ants by placing the granules on ant hills. The success of this method, however, can be limited because ant hills have multiple queen ants, and all queen ants must be eliminated in order to exterminate the entire ant colony. When this method is used, the worker ants take the granules inside the ant hill, where the granules are converted into liquid and consumed by the ants. Because the process is relatively slow, not all ants die at once. If a worker ant dies from consuming the granules, one or more of the queen ants will refuse to eat the granules and may relocate the ant colony. Therefore, this method may require frequent applications of the granules on existing ant hills and on new ant hills resulting from the ants' relocation. The versatility and effectiveness of this method is therefore limited.

Still further, in several of the existing methods and apparatuses, an exterminating agent is introduced into a pests' dwelling using a wand, a probe or a conduit that is inserted into the dwelling to ensure application of the agent in the proper location within the dwelling. Consequently, the pests are likely to be disturbed prior to the application of the agent, and many of the pests may escape the dwelling before they are affected by the agent being applied. Liquids sprayed on a surface of a pests' dwelling have also been used to control pests. Such applications, however, only affect the pests that are outside of the dwelling or are in any areas of the subterranean tunnels that may be reached by the liquid that flows through the pest entrances.

Consequently, there has been a need for an effective, environmentally safe, lightweight, inexpensive, versatile, easy to operate, portable apparatus for controlling pests and a method for its use. Providing an apparatus that contains within an enclosed interior cavity of a housing a fluid used to kill, incapacitate or eliminate pests until such time as the fluid infuses the pests' dwelling will protect the surrounding environment, the operator of the apparatus and any persons, animals, insects and vegetation that may be nearby. Providing a lightweight, inexpensive, easy to operate and portable apparatus will make the apparatus more readily available and affordable to users and will provide an incentive for more users to kill, incapacitate or eliminate the pests that threaten or annoy the users, their animals, their property and the environment. Providing an apparatus that rapidly infuses all areas of the pests' dwelling and does not disturb the dwelling prior to infusion of the fluid into the dwelling, thus avoiding escape by the pests prior to infusion, will maximize the effectiveness of the apparatus and method. Providing an apparatus that can completely or partially surround obstructions adjacent the pests' dwelling increases the versatility of the apparatus and method. It is to this end that the present invention has been developed.

BRIEF SUMMARY OF THE INVENTION

According to one aspect of the invention, an apparatus is provided which includes a housing and a container of pressurized fluid formulated to eliminate pests. The housing has an open end, an open interior cavity and an inside surface and is adapted to sit on a surface surrounding a pest dwelling with pest entrances, thereby forming a closed interior cavity and enclosing the pest entrances. The housing also includes an upper wall connected to a continuous sidewall, the continuous sidewall having an upper surface. The housing further includes a first section housing, a second section housing, a first section flexible sealing member associated with the first section housing and a second section flexible sealing member associated with the second section housing. The first section housing includes a first section opening edge, and the second section housing includes a second section opening edge, the first section opening edge and the second section opening edge defining an upper surface opening in the upper surface of the continuous sidewall. The first section sealing member sealably engages the first section opening edge and a first outside surface of an interior obstruction extending upwardly from the surrounding surface through the upper surface opening, and the second section sealing member sealably engages the second section opening edge and a second outside surface of the interior obstruction, thereby sealably filling the upper surface opening. The housing also includes an activation mechanism including a sealable aperture in the housing, door guides adjacent the sealable aperture and a slidable door connected to and moveable along the door guides. The container has a spray release mechanism including a nozzle for releasing the pressurized fluid. The container is disposed on the surrounding surface such that the nozzle is located in spaced relation to the activation mechanism within the closed interior cavity. With the slidable door in an open position, a finger of an operator can be inserted into the closed interior cavity through the sealable aperture to operatively engage the spray release mechanism, causing the nozzle to release the pressurized fluid into the closed interior cavity.

According to a further aspect of the invention, the activation mechanism includes a sealable aperture and a hinged door which is pivotably connected to the inside surface of the housing adjacent an upper edge of the aperture. A finger of the operator can be inserted into the closed interior cavity through the sealable aperture by applying a force in an inward direction on the outside surface of the hinged door, causing the hinged door to swing inwardly within the closed interior cavity. The operator can operatively engage the inserted finger with the spray release mechanism, causing the nozzle to release the pressurized fluid into the closed interior cavity.

According to another aspect of the invention, the activation mechanism includes a container aperture located in the housing and an L-shaped lever mechanism connected at one end to the inside surface of the housing and projecting inwardly from the inside surface. The container is slidably inserted through the container aperture into the closed interior cavity. The distal end of the lever mechanism is spaced apart from and aligned with the container aperture to allow the spray release mechanism to operably engage the lever mechanism, thereby causing the nozzle to release the pressurized fluid into the closed interior cavity.

According to a further aspect of the invention, the lever mechanism includes an elongated lever member connected at one end to the inside surface of the housing and projecting inwardly from the inside surface. The distal end of the lever mechanism is spaced apart from and aligned with the container aperture to allow the spray release mechanism to operably engage the lever mechanism, thereby causing the nozzle to release the pressurized fluid into the closed interior cavity.

According to yet another aspect of the invention, the activation mechanism includes a plunger aperture located in the upper wall of the housing and an elongated plunger member slidably inserted through the plunger aperture and aligned with the spray release mechanism to allow an upper end of the plunger member to be located above the upper wall and a lower end of the plunger member to engage the spray release mechanism. Downward force can be applied to the upper end, causing the lower end to operably engage the spray release mechanism, thereby causing the nozzle to release the pressurized fluid into the closed interior cavity.

In operation, the first section housing and the second section housing are spaced apart and positioned so that the interior obstruction is located in a space between the first section housing and the second section housing. The first section housing and the second section housing are aligned and sealingly engaged such that the first section outer edge and the second section outer edge define the open end of the housing and the first section opening edge and the second section opening edge define the upper section opening. The open end contacts the surrounding surface, to thereby enclose the pest entrances, with the interior obstruction extending upwardly from the surrounding surface through the upper surface opening. The first sealing member sealably engages the first outside surface of the interior obstruction and the first section opening edge, and the second sealing member sealably engages the second outside surface of the interior obstruction and the second section opening edge, thereby sealably filling the upper surface opening.

According to a still further aspect of the invention, the housing may include at least one fluid guide adjacent and connected to the inside surface of the housing for allowing the pressurized fluid to flow in the direction of the surface containing the pest entrances.

According to an even further aspect of the invention, the housing may include removable sections for providing closeable openings in the housing, the closeable openings including closeable opening edges defining the closeable openings, to allow the closeable opening edges to be disposed against the surfaces of perimeter obstructions, thereby causing the pest entrances to be disposed within the closed interior cavity.

According to yet another aspect of the invention, the apparatus includes a housing, a container of pressurized fluid formulated to eliminate pests, a container positioning member and a trigger mechanism. The housing has an open end, an open interior cavity and an inside surface defined by a continuous sidewall connected to a closed end. The housing is adapted to sit on a surface surrounding a pest dwelling with pest entrances and to form a closed interior cavity enclosing the pest entrances. The container includes a spray release mechanism including a nozzle for releasing the pressurized fluid. The container positioning member includes a container holder and a guide member connected to the container holder. The container positioning member is positioned in a predetermined position on the surrounding surface and is adapted so that the container may be slidably inserted through an open end of, and into an open interior cavity of, the container holder, causing the nozzle to be located above the open end of the container holder. The trigger mechanism includes an attachment member connected to a cantilever member. The attachment member is removably connected to the housing so that the attachment member is disposed adjacent the inside surface of the housing, causing the cantilever member to project inwardly within the open interior cavity. The guide member is slidably inserted into a through bore in the cantilever member, the cantilever member operably engages the spray release mechanism, causing the pressurized fluid to be released, and the outer edge of the housing contacts the surrounding surface, thereby forming the closed interior cavity within which the pressurized fluid is released, the housing being positioned so that the pest entrances are enclosed within the closed interior cavity.

These and other features and advantages of the invention will become apparent upon reference to the following detailed description and the accompanying drawings.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
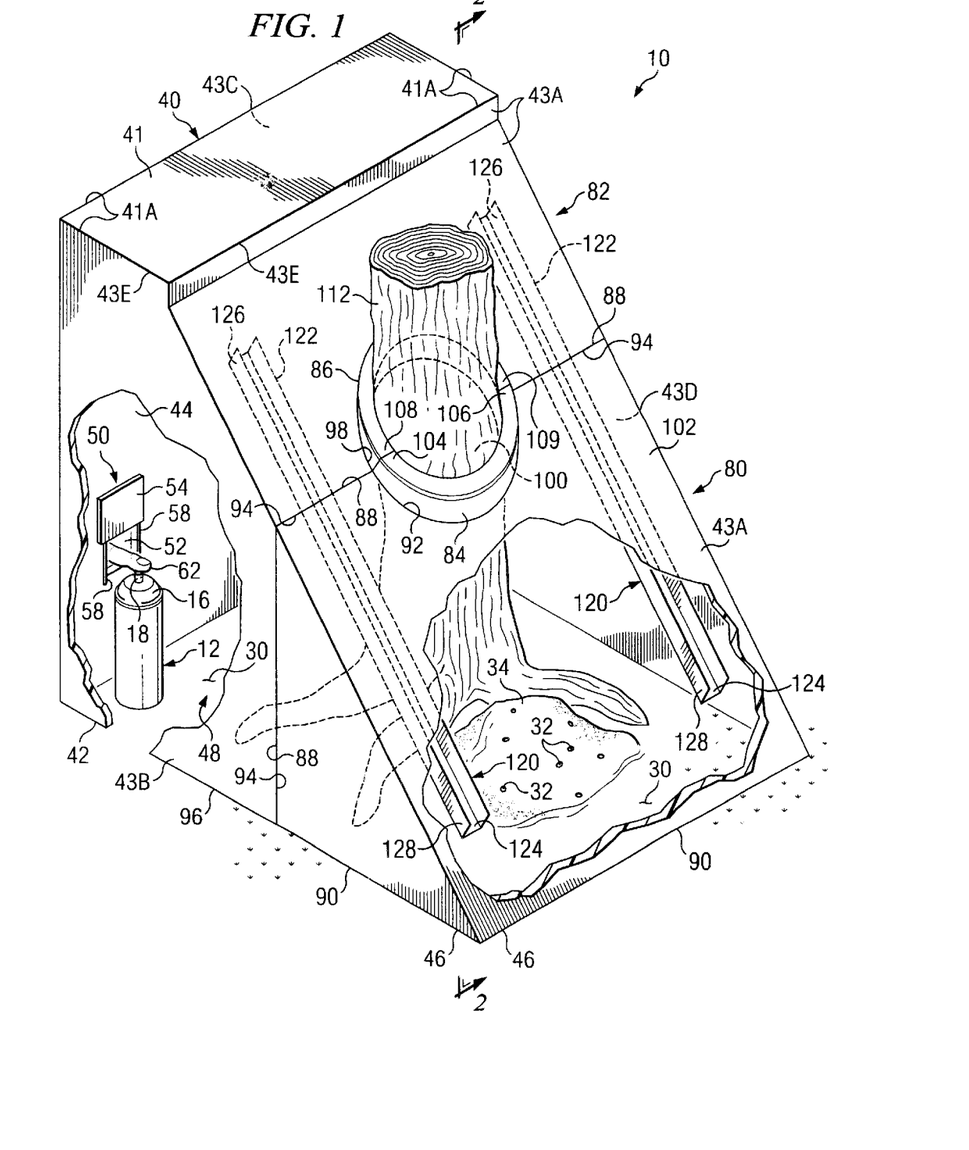
FIG. 1 is a perspective view of the apparatus for controlling pests according to an embodiment of the present invention.
Figure 2:
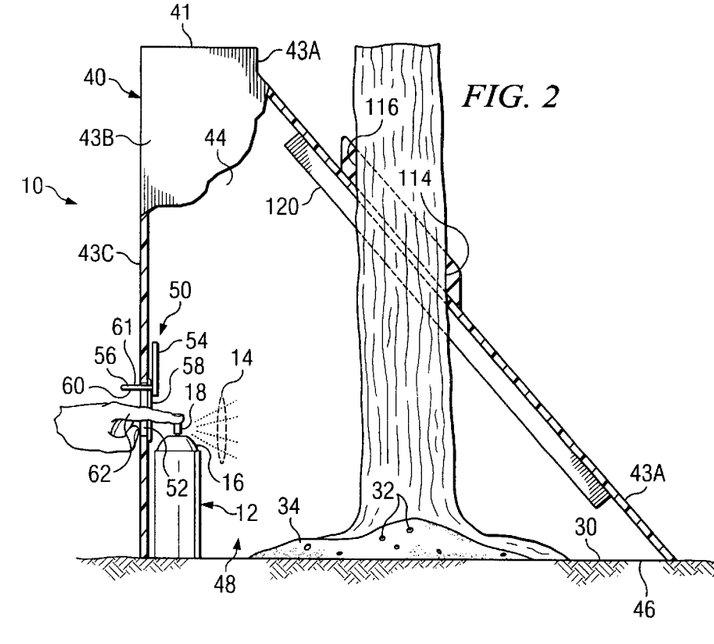
FIG. 2 is a cross-sectional view taken along the line 2—2 of FIG. 1.

Referring to the drawings, and to FIGS. 1 and 2 in particular, an exemplary embodiment of an apparatus 10 for controlling pests in accordance with the present invention is illustrated. The apparatus 10 includes a container 12 of pressurized fluid 14 that is located at least partially in a housing 40. The fluid is preferably formulated to eliminate one or more pests, and the housing 40 is adapted to sit on a surface 30 surrounding a pest dwelling 34 with one or more pest entrances 32. The housing 40 has an open end 42 and an inside surface 44. The open end 42 has an outer edge 46 for contacting the surface 30, thereby forming a closed interior cavity 48 and enclosing the pest entrances 32 within the closed interior cavity 48. The housing 40 includes an upper wall 41 and a continuous sidewall 43 including a first sidewall portion 43A, a second sidewall portion 43B, a third sidewall portion 43C and a forth sidewall portion 43D. An upper edge 43E of the continuous sidewall 43 is connected to an outer edge 41A of the upper wall 41. The upper wall 41 may be integral with the continuous sidewall 43 or it may be connected in a variety of ways using mechanical fasteners, adhesives, welding, and so on.

Referring now to FIG. 1, the housing 40 preferably includes a first section housing 80, a second section housing 82, a first section flexible sealing member 84 associated with the first section housing and a second section flexible sealing member 86 associated with the second section housing. The first section housing 80 includes at least one first section mating edge 88, a first section outer edge 90 and a first section opening edge 92. The second section housing 82 includes at least one second section mating edge 94, a second section outer edge 96 and a second section opening edge 98. The outer edge 46 includes the first section outer edge 90 and the second section outer edge 96. The first section opening edge 92 and the second section opening edge 98 define an upper surface opening 100 in an upper surface 102 of the first sidewall portion 43A. The first section flexible sealing member 84 includes a first end 104 and a second end 106. The second section flexible sealing member 86 includes a first end 108 and a second end 109. The first flexible sealing member 84 sealably engages the first section opening edge 92 and a first outside surface 114 of an interior obstruction 112 extending upwardly from the surface 30 through the upper surface opening 100, and the second flexible sealing member 84 sealably engages a second outside surface 116 of the interior obstruction 112 and the second section opening edge 98, thereby sealably filling the upper surface opening 100. The housing 40 also includes an activation mechanism 50 for activating a spray release mechanism 16 of the container 12.

The container 12 includes the spray release mechanism 16 including a nozzle 18 for releasing the pressurized fluid 14 and a container bottom 20 for contacting the surface 30. In operation, the activation mechanism activates the spray release mechanism 16, allowing the nozzle 18, which is positioned within the closed interior cavity 48, to release the pressurized fluid 14 into the closed interior cavity 48. The closed interior cavity 48 fills with the pressurized fluid 14, and the pressurized fluid 14, which is heavier than air, passes through the pest entrances 32 and into the pests' places of habitation. In some applications, the closed interior cavity 48 may fill with the pressurized fluid 14 until the pressure in the closed interior cavity 48 reaches a sufficient level to force the pressurized fluid through the pest entrances 32 and into the pests' place(s) of habitation. The container 12 can be any of a variety of containers of fluid formulated to eliminate pests, including conventional foggers and spray devices for dispensing liquid insecticide. For example, aerosol foggers containing environmentally safe fast-acting chemicals approved by the United States Environmental Protection Agency are economical and readily available for use in killing insects. Container 12 also can include a locking mechanism for dispensing the entire contents of the container 12 without continuously applying pressure to the spray release mechanism 16.

Figure 3:
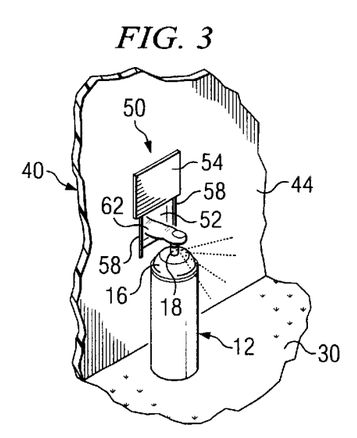
FIG. 3 is a partially sectioned perspective view of the apparatus illustrating the container of pressurized fluid and the activation mechanism employing a slidable door for sealing the sealable aperture.

In an exemplary embodiment of the invention illustrated in FIGS. 1, 2 and 3, the spray release mechanism 16 is positioned within the closed interior cavity 48 in a predetermined position in spaced relation to the activation mechanism 50. As illustrated in FIG. 3, the activation mechanism 50 includes a sealable aperture 52, door guides 58 adjacent the sealable aperture 52, a slidable door 54 connected to and moveable along the door guides 58 and a door handle 56 connected to the slidable door 54. An operator can apply upward pressure on the bottom surface 60 of the door handle 56 to cause the slidable door 54 to move along the door guides 58 from a closed position adjacent the sealable aperture 52 to an open position adjacent the inside surface 44 above the sealable aperture 52. Likewise, the operator can apply downward pressure on the top surface 61 of the door handle 56 (FIG. 2) to cause the slidable door 54 to move along the door guides 58 from an open position adjacent the inside surface 44 above the sealable aperture 52 to a closed position adjacent the sealable aperture 52. As illustrated in FIGS. 2 and 3, a finger 62 of the operator can be inserted into the closed interior cavity 48 through the sealable aperture 52 with the slidable door 54 in an open position to operatively engage the spray release mechanism 16, causing the nozzle 18 to release the pressurized fluid 14 into the closed interior cavity 48.

Figure 4:
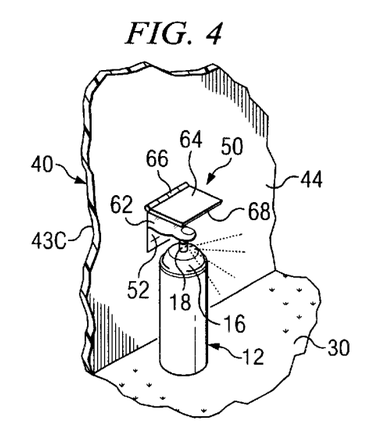
FIG. 4 is a partially sectioned perspective view of the apparatus showing the container of pressurized fluid and an alternative embodiment of the activation mechanism employing a hinged door for sealing the sealable aperture.

A further embodiment of the activation mechanism 50 is illustrated in FIG. 4. A hinged door 64 is pivotably connected to the inside surface 44 of the sidewall portion 43C. A finger 62 of the operator can be inserted into the closed interior cavity 48 through the sealable aperture 52 by applying a force in an inward direction on the outside surface 68 of the hinged door 64, causing the hinged door 64 to swing inwardly within the closed interior cavity 48. The operator can operatively engage the inserted finger 62 with the spray release mechanism 16, causing the nozzle 18 to release the pressurized fluid 14 into the closed interior cavity 48. The hinged door 64 in an open position can be moved to a closed position adjacent the sealable aperture 52 by withdrawing the inserted finger 62 from the closed interior cavity through the sealable aperture and allowing the force of gravity to move the hinged door 64 to a closed position adjacent the sealable aperture 52.

Figure 5:
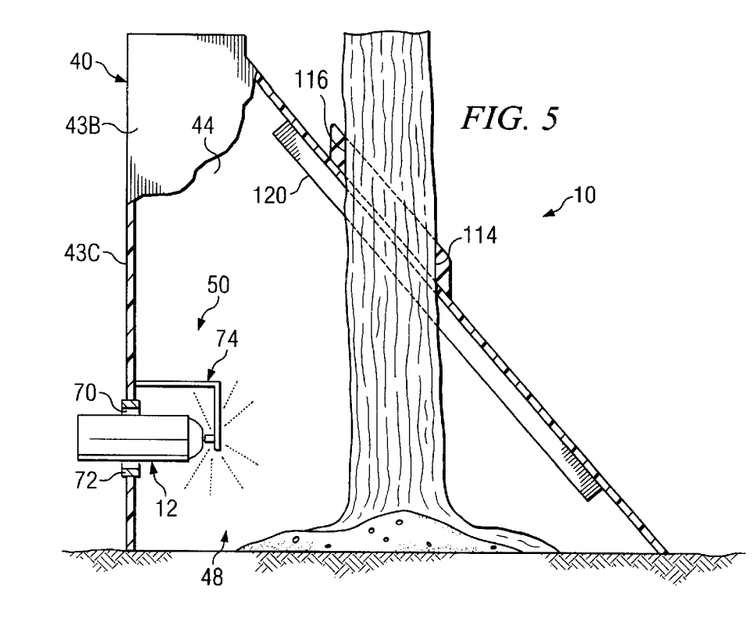
FIG. 5 is a cross-sectional view of the apparatus illustrating the container of pressurized fluid and an alternative embodiment of the activation mechanism employing an L-shaped lever mechanism for activating the spray release mechanism of the container.
Figure 6:
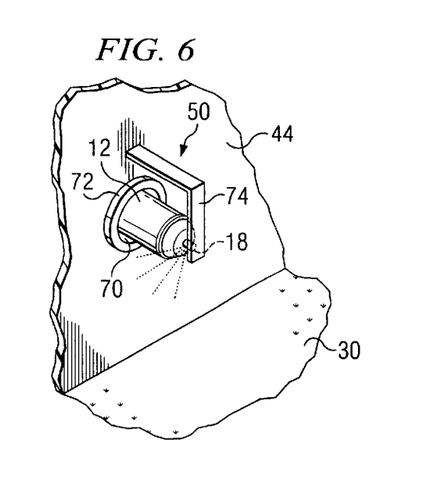
FIG. 6 is a partially sectioned perspective view of the apparatus showing the container of pressurized fluid and the alternative embodiment of the activation mechanism employing the L-shaped lever mechanism for activating the spray release mechanism of the container.

An even further embodiment of the activation mechanism 50 is illustrated in FIGS. 5 and 6. A container aperture 70 is located in the housing 40. The container aperture 70 is defined by a continuous flange member 72, the flange member being integral with the housing 40. The container 12 is slidably inserted through the container aperture 70 into the closed interior cavity 48. The flange member 72 provides support for the container 12 for holding the container in place in the container aperture 70. An L-shaped lever mechanism 74 is connected at one end to the inside surface 44 and projects inwardly from the inside surface 44. The distal end of the lever mechanism 74 is spaced apart from and aligned with the container aperture 70 to allow the spray release mechanism 16 to operably engage the lever mechanism 74, thereby causing the nozzle 18 to release the pressurized fluid 14 into the closed interior cavity 48. In operation, the flange member 72 is sleeved over the container 12 and the container 12 is positioned within the container aperture 70, such that the pressurized fluid is prevented from escaping the closed interior cavity 48 through the container aperture 70.

Figure 7:
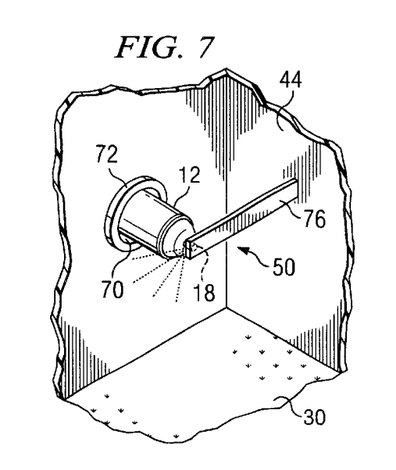
FIG. 7 is a partially sectioned perspective view of the apparatus showing the container of pressurized fluid and an alternative embodiment of the activation mechanism employing an elongated lever member for activating the spray release mechanism of the container.

FIG. 7 depicts a further embodiment of the lever mechanism. An elongated lever member 76 is connected at one end to the inside surface 44 and projects inwardly from the inside surface 44. The distal end of the lever mechanism 76 is spaced apart from and aligned with the container aperture 70 to allow the spray release mechanism 16 to operably engage the lever mechanism 76, thereby causing the nozzle 18 to release the pressurized fluid 14 into the closed interior cavity 48. In operation, the flange member 72 is sleeved over the container 12 and the container 12 is positioned within the container aperture 70, such that the pressurized fluid is prevented from escaping the closed interior cavity 48 through the container aperture 70.

Figure 7A:
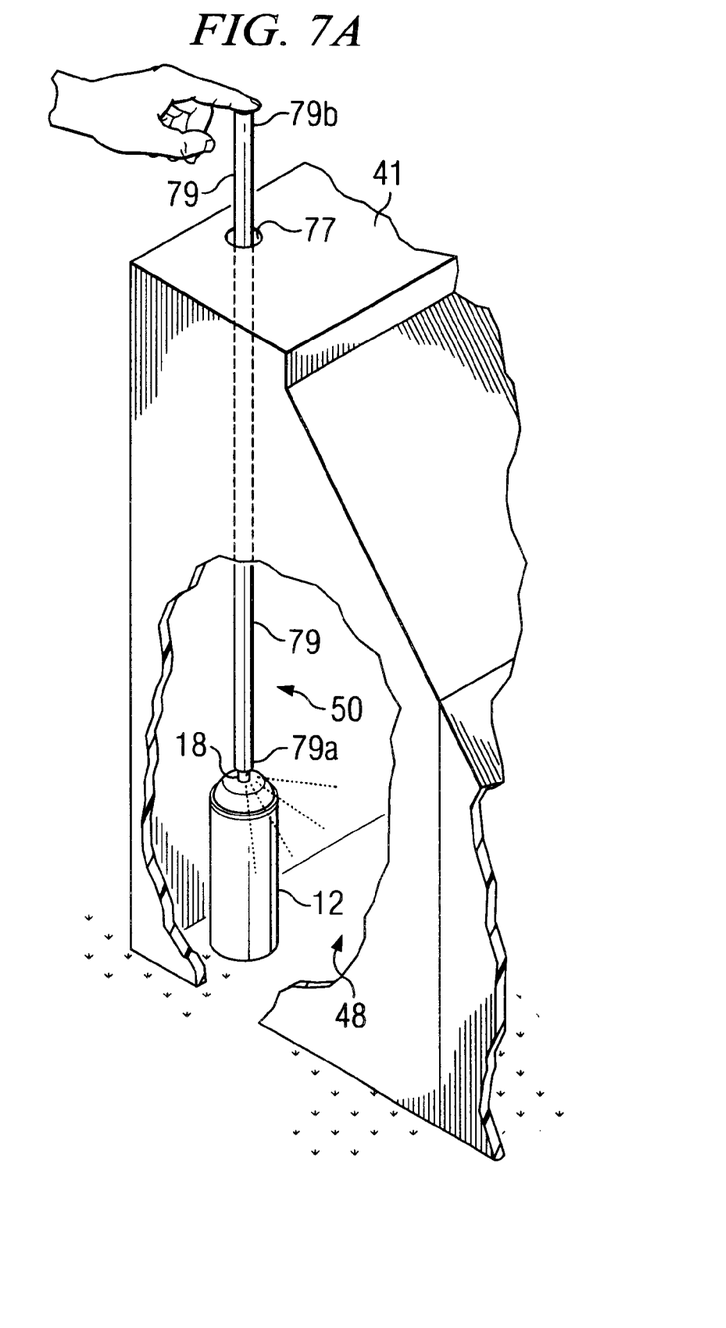
FIG. 7A is a partially sectioned perspective view of the apparatus showing the container of pressurized fluid and an alternative embodiment of the activation mechanism employing a plunger member for activating the spray release mechanism of the container.

FIG. 7A depicts yet a further embodiment of the activation mechanism 50. A plunger aperture 77 is located in the upper wall 41. An elongated plunger member 79 is slidably inserted through the plunger aperture 77 and aligned with the spray release mechanism 16 to allow a lower end 79a of the plunger member 79 to engage the spray release mechanism 16. An upper end 79b of the plunger member 79 is located above the upper wall 41. In operation, the operator can apply a downward force on the upper end 79b, causing the lower end 79a to operably engage the spray release mechanism 16, thereby causing the nozzle 18 to release the pressurized fluid 14 into the closed interior cavity 48. The plunger member 79 substantially fills the plunger aperture 77, such that the pressurized fluid 14 is prevented from escaping the closed interior cavity 48 through the plunger aperture 77.

In operation, and with reference to FIG. 1, the first section housing 82 and the second section housing 84 are spaced apart and positioned so that the interior obstruction 112 extending upwardly from the surface 30 containing the pest entrances 32 is located in a space between the first section housing and the second section housing. The interior obstruction 112 can be any of a variety of obstructions extending from the surface 30, including a tree, a fence post, a telephone pole, a light pole, a lamp post, and so on. The at least one first section mating edge 88 and the at least one second section mating edge 94 are aligned and sealingly engaged such that the first section outer edge 90 and the second section outer edge 96 define the open end 42 of the housing 40. The open end 42 contacts the surface 30, to thereby enclose the pest entrance(s) 32 with the interior obstruction 112 extending upwardly from the surface 30 through the upper surface opening 100. The first end 104 of the first section flexible sealing member 84 abuts and sealably engages the first end 108 of the second section flexible sealing member 86 and the second end 106 of the first section flexible sealing member 84 abuts and sealably engages the second end 109 of the second section flexible sealing member 86. The first flexible sealing member 84 sealably engages the first outside surface 114 of the interior obstruction 112 and the first section opening edge 92 and the second flexible sealing member 84 sealably engages the second outside surface 116 of the interior obstruction 112 and the second section opening edge 98, thereby sealably filling the upper surface opening 100 and at least substantially preventing pressurized fluid 14 from escaping the closed interior cavity 48 through the upper surface opening 100.

As illustrated in FIG. 1, the housing 40 may include at least one fluid guide 120 adjacent and connected to the inside surface 44 of the housing 40. The at least one fluid guide 120 comprises an elongated enclosure 122 forming a fluid guide cavity 124 open at a first end 126 and at a second end 128. The first end 126 is spaced apart from the nozzle 18 of the spray release mechanism 16, and the second end 128 is positioned between the first end and the surface 30 containing the pest entrances 32. The at least one fluid guide 120 allows the pressurized fluid to flow through the fluid guide cavity 124 in the direction of the surface 30 containing the pest entrances 32. The at least one fluid guide 120 is illustrated in FIG. 1 as being configured in the shape of a channel. The at least one fluid guide 120 may be configured in any of a variety of shapes and sizes without departing from the spirit and scope of the invention.

Figure 8:
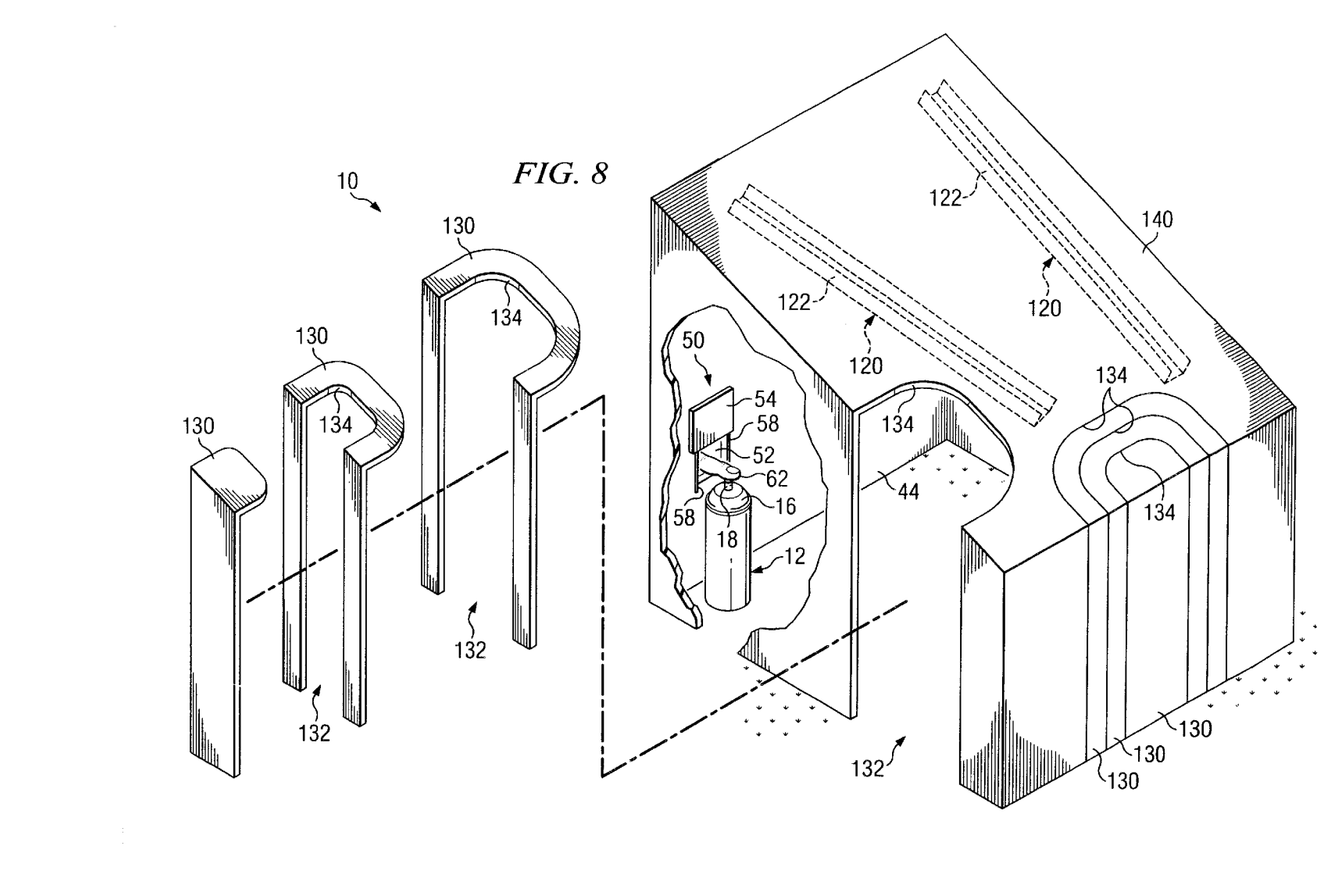
FIG. 8 is a perspective view of the apparatus illustrating an alternative embodiment of the housing employing removable sections for providing closeable openings in the housing.

FIG. 8 illustrates a further embodiment of the housing 140. The housing 140 may be configured in any of a variety of shapes and sizes without departing from the spirit and scope of the invention. As illustrated in FIG. 8, the housing 140 may include at least one removable section 130 for providing at least one closeable opening 132 in the housing 140, the at least one closeable opening 132 including a closeable opening edge 134 defining the at least one closeable opening 132, to allow the closeable opening edge 134 to be disposed against the surface of a perimeter obstruction, which can be any of a variety of obstructions extending from the surface 30, such as a tree, a fence post, a telephone pole, a light pole, a lamp post, an air conditioner or an electrical device used in the provision of electricity or telephone service (not shown), thereby causing the pest entrances 32 to be disposed within the closed interior cavity 48, and thereby causing the pressurized fluid 14 to be at least partially prevented from or delayed in passing through the at least one closeable opening 132 in the housing 140.

A further embodiment of the apparatus for controlling pests in accordance with the present invention is illustrated in FIGS. 9, 10, 11 and 12. The apparatus 110 includes a container 212 of pressurized fluid 214 that is preferably formulated to eliminate one or more pests, the container 212 being located in a housing 240, and the housing 240 is adapted to sit on a surface 230 surrounding a pest dwelling 234 with one or more pest entrances 232. The apparatus 110 further includes a container positioning member 250, the container positioning member 250 being positioned on the surrounding surface 230 and located inside the housing 240, and a trigger mechanism 270, the trigger mechanism 270 being removably connectable to the housing 240.

Figure 9:
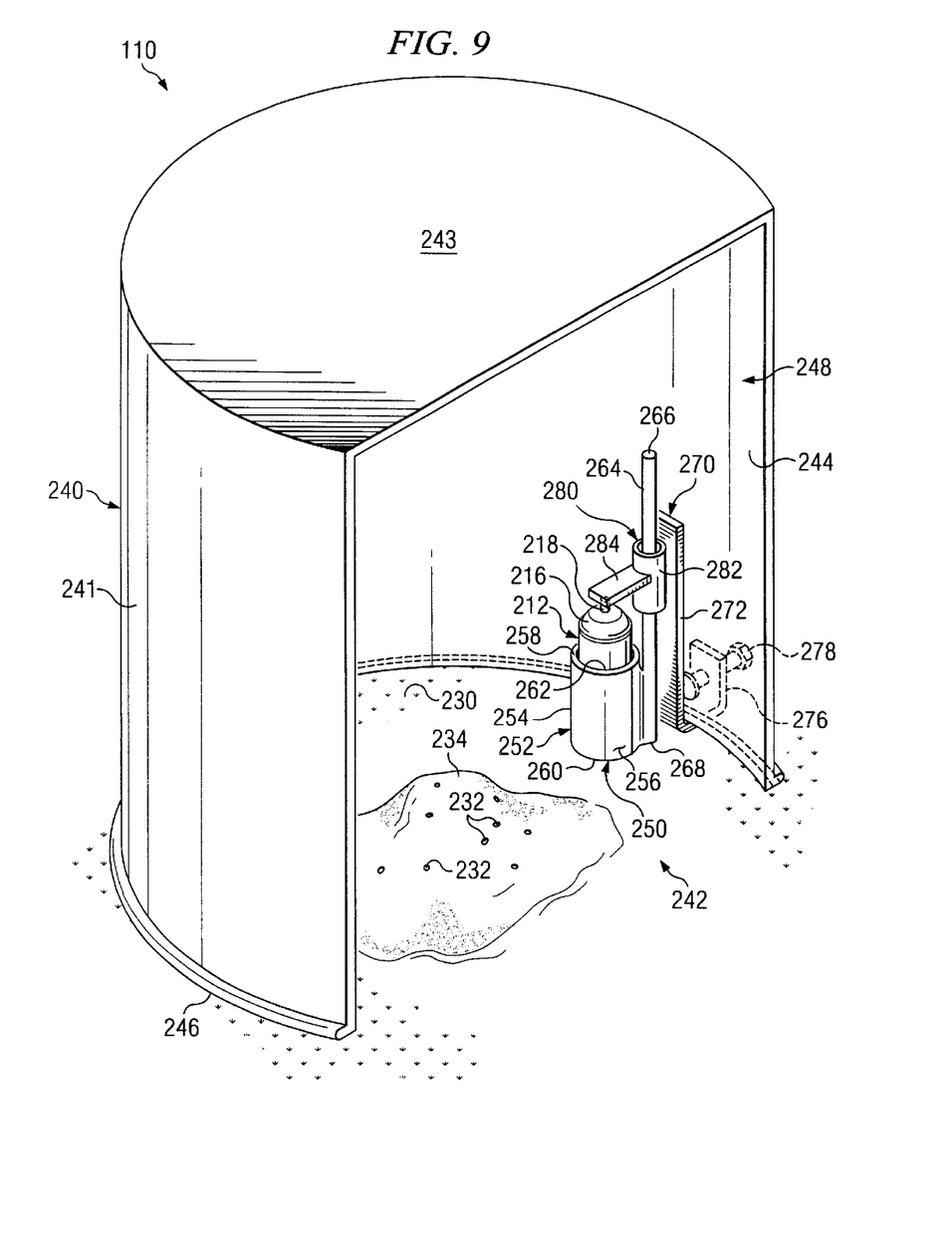
FIG. 9 is a partially-sectioned perspective view of an alternative embodiment of the apparatus employing a container positioning member and a removably attachable trigger mechanism for activating the spray release mechanism of the container.

The housing 240 has an open end 242 and an inside surface 244 defined by a continuous sidewall 241 connected to a closed end 243. The open end 242 has an outer edge 246 for contacting the surrounding surface 230 containing the one or more pest entrances 232 to a pest dwelling 234, thereby forming a closed interior cavity 248 and enclosing the pest entrances 232. As is shown in FIG. 9, the housing 240 may comprise a conventional bucket. The housing 240 may alternatively comprise any of a variety of readily available containers, including a tub, a five-gallon paint can, a waste can, and so on. Although the housing illustrated in FIG. 9 is a substantially cylindrical enclosure defined by the curved sidewall 241 and the closed end 243, it will be understood that the housing may have any of a variety of shapes, including a housing with three or more substantially planar or curved sidewalls.

The container 212 includes a spray release mechanism 216 including a nozzle 218 for releasing the pressurized fluid 214 and a container bottom 220 (not shown).

Figure 12:
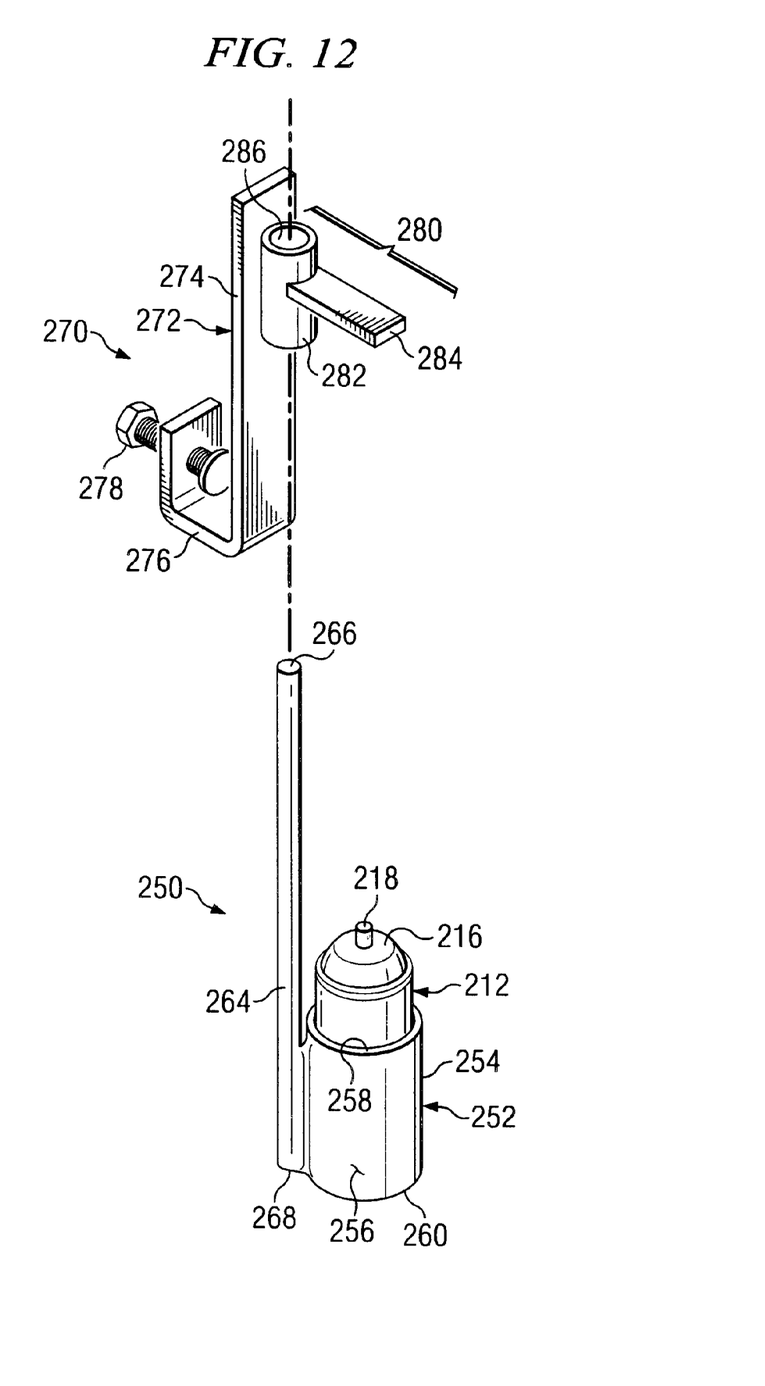
FIG. 12 is an exploded view of the container, the container positioning member and the trigger mechanism of the apparatus of FIG. 9.

The container positioning member 250 includes a container holder 252 and a guide member 264. The container holder 252 is a substantially cylindrical enclosure defined by a curved sidewall 254 having an outside surface 256, an open end 258 and a closed end 260, the container holder 252 defining an open interior cavity 262. The guide member 264 is an elongated rod or tube with an upper end 266 and a lower end 268. The outside surface 256 of the sidewall 254 of the container holder 252 is connected to the guide member 264 so that the upper end 266 of the guide member 254 extends beyond the open end 258 of the container holder 252.

The trigger mechanism 270 includes an attachment member 272 and a cantilever member 280. The attachment member 272 includes an elongated support member 274, integral at one end with a U-shaped return member 276, and a clamping member 278 for clamping the attachment member 272 to the housing 240 so that the elongated support member 274 is held in position inside the closed interior cavity 248 adjacent the inside surface 244. It will be understood that the attachment member 272 may be integral with the housing 240 or connected by means other than clamping, including the use of mechanical fasteners such as screws, bolts or rivets.

The cantilever member 280 includes an alignment collar 282 and a nozzle activation member 284 connected thereto and extending inwardly within the closed interior cavity 248, the alignment collar 282 includes a through bore 286. The alignment collar 282 is connected to the support member 274 in a location such that in operation the nozzle activation member 284 operably engages the spray release mechanism 216 when the outer edge 246 of the housing 240 contacts the surface 230, thereby forming the closed interior cavity 248.

Figure 10:
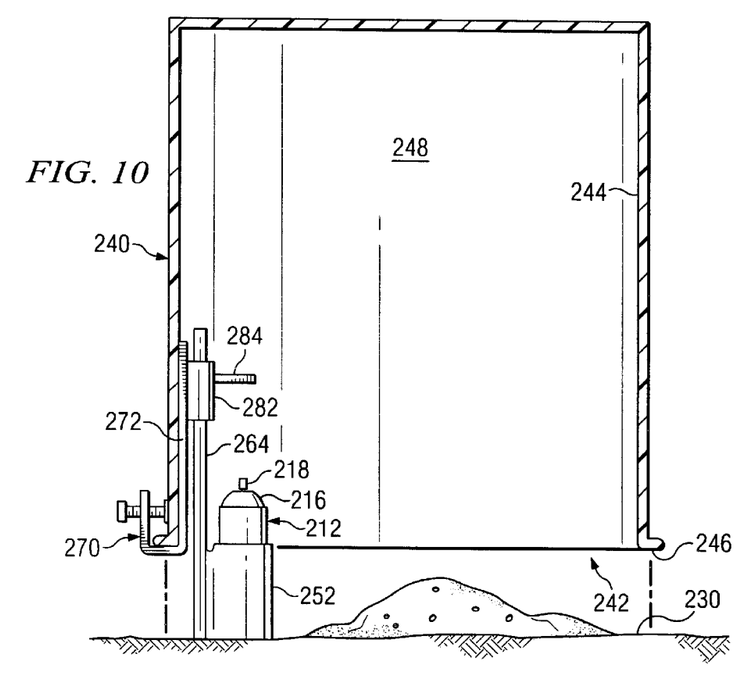
FIG. 10 is a cross-sectional view of the alternative embodiment of the apparatus of FIG. 9 illustrating the housing positioned above the surface surrounding the pest dwelling.
Figure 11:
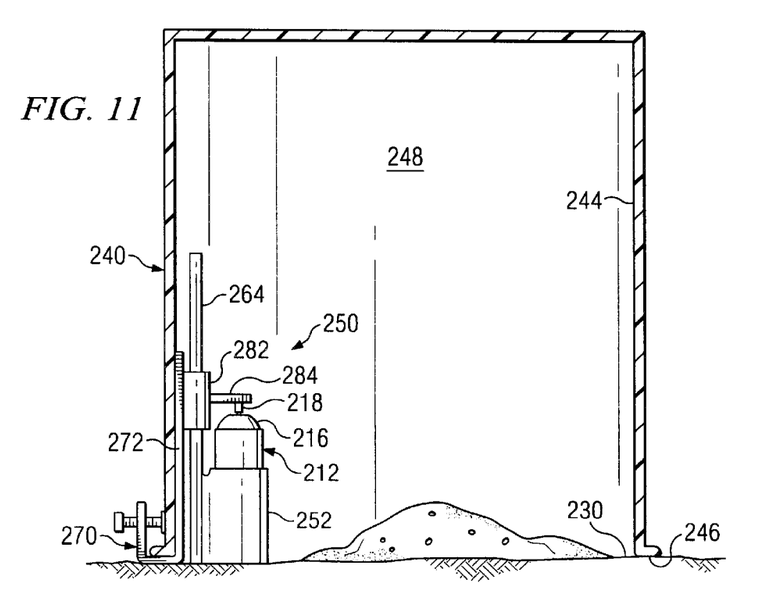
FIG. 11 is a cross-sectional view of the alternative embodiment of the apparatus of FIG. 9 illustrating the housing positioned so that the outer edge of the housing contacts the surface surrounding the pest dwelling.

FIGS. 10, 11 and 12 illustrate the operation of this embodiment of the invention. The closed end 260 of the container holder 252 is located in a predetermined position on the surface 230, and the container 212 is slidably inserted through the open end 258 of the container holder 252 into the open interior cavity 262 of the container holder 252, allowing the container bottom 220 to be disposed against the closed end 260 within the open interior cavity 262 of the container holder 252, the nozzle 218 being located in a position above the open end 258 of the container holder 252. The attachment member 272 is clamped to the housing member 240 causing the attachment member 272 to be disposed adjacent the inside surface 244 and causing the cantilever member 280 to project inwardly within the open interior cavity 248. The guide member 264 is slidably inserted into the through bore 286 of the alignment collar 282, the nozzle engagement member 284 operably engages the spray release mechanism 216, causing the pressurized fluid 214 to be released, and the outer edge 246 of the housing 240 contacts the surface 230, thereby forming the closed interior cavity 248 within which the pressurized fluid 214 is released, the housing 240 being positioned so that the pest entrances 232 are enclosed within the closed interior cavity 248. The trigger mechanism may comprise a variety of configurations and combinations of components in accordance with the present invention. In one alternate embodiment, for example, the trigger mechanism may include a cantilever member connected directly to an elongated support member, the cantilever member having a through bore through which a guide member is slidably inserted.

Thus, what has been disclosed is an inventive effective, environmentally safe, lightweight, inexpensive, versatile, easy to operate, portable apparatus for controlling pests and a method for its use.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A pest control apparatus comprising:

a container of pressurized fluid formulated to eliminate pests, the container having a spray release mechanism including a nozzle for releasing the pressurized fluid; and a housing having an open end and an inside surface and defining an open interior cavity, the open end having an outer edge for contacting a surface surrounding a pest dwelling, the surrounding surface having at least one pest entrance through which a pest may pass to enter or exit the dwelling, the inside surface of the housing and the surrounding surface forming a closed interior cavity adjacent the surrounding surface, the housing being operatively associated with an activation mechanism for activating the spray release mechanism, the nozzle being positioned within the closed interior cavity, allowing the pressurized fluid to be released within the closed interior cavity, pass through the at least one pest entrance to thereby infuse the pest dwelling.

2. The apparatus according to claim 1 wherein the container of pressurized fluid comprises a conventional fogger canister for dispersion of pesticide vapor.

3. The apparatus according claim 1 wherein the container of pressurized fluid comprises a conventional spray can for dispersion of pesticide liquid.

4. The apparatus according to claim 1 wherein the activation mechanism comprises a closable access aperture in the housing in spaced relation to the spray release mechanism, so that the spray release mechanism can be operatively engaged through the access aperture and caused to release the pressurized fluid within the closed interior cavity.

5. The apparatus according to claim 1 wherein the activation mechanism comprises:

a container aperture in the housing; and a lever mechanism within the closed interior cavity of the housing, the lever mechanism connected at one end to the inside surface of the housing and extending inwardly from the inside surface of the housing;

whereby the container of pressurized fluid is slidably insertable into the container aperture for positioning the nozzle of the container within the closed interior cavity and for causing the spray release mechanism to operatively engage the lever mechanism, thereby causing the nozzle of the spray release mechanism to release the pressurized fluid into the closed interior cavity.

6. The apparatus according to claim 1 wherein the activation mechanism comprises:

a plunger aperture in the housing; and a plunger member;

whereby the plunger member is slidably insertable into the plunger aperture so that the plunger member can operatively engage the spray release mechanism and cause the spray release mechanism to release the pressurized fluid within the closed interior cavity.

7. The apparatus according to claim 1 wherein the housing further comprises:

a first section housing including a first section opening edge, the first section opening edge spaced apart from the open end of the housing;

a second section housing including a second section opening edge, the second section opening edge spaced apart from the open end of the housing;

wherein the first section housing and the second section housing are separable for positioning around an interior obstruction extending upwardly from the surface containing the pest entrances.

8. The apparatus according to claim 7 wherein the housing further comprises:

a first section flexible sealing member adjacent the first section opening edge; and a second section flexible sealing member adjacent the second section opening edge;

wherein the first section flexible sealing member is adapted to abut and sealably engage a first outside surface of the interior obstruction, the section flexible sealing member being adapted to abut and sealably engage a second outside surface of the interior obstruction, to thereby prevent the pressurized fluid from escaping the closed interior cavity.

9. The apparatus according to claim 1 and further comprising at least one fluid guide adjacent and connected to the inside surface of the housing, the at least one fluid guide comprising an elongated enclosure forming a fluid guide cavity with a first end and a second end, the fluid guide cavity being open at the first end and at the second end, the first end spaced apart from the nozzle of the spray release mechanism and the second end positioned between the first end and the surface containing the pest entrances, whereby the at least one fluid guide allows the pressurized fluid to flow through the fluid guide cavity in the direction of the surface containing the pest entrances.

10. The apparatus according to claim 1 wherein the housing also includes at least one removable section for providing at least one closeable opening in the housing, the at least one closeable opening including a closeable opening edge defining the at least one closeable opening, to allow the opening edge to be disposed against the surface of a perimeter obstruction, thereby causing the pest entrances to be disposed within the closed interior cavity, and thereby causing the pressurized fluid to be prevented from or delayed in passing through the at least one closeable opening in the housing.

11. The apparatus according to claim 1 wherein the housing is a conventional bucket.

12. The apparatus according to claim 1 wherein the activation mechanism comprises:
   a container positioning member including an elongated guide member and a container holder connected to the elongated guide member, the container holder having an outside surface, an inside cavity, a closed end and an open end, the open end defined by an open end edge, the closed end adjacent the surface containing the pest entrances and connectable thereto, the elongated guide member extending outwardly from the surface containing the pest entrances along the outside surface of the container holder and beyond the open end edge;
   a trigger mechanism including an attachment member removably connectable to the housing and a cantilever member connected to the attachment member, the cantilever member having a through bore including an axis alignable with the axis of the guide member;
   wherein the elongated guide member is slidably insertable into the through bore of the cantilever member, allowing the cantilever member to move along the axis of the guide member and operatively engage the spray release mechanism as the housing is moved toward the surface containing the pest entrances, thereby allowing the outer edge of the housing to contact the surface containing the pest entrances and to form the closed interior cavity and causing the nozzle of the spray release mechanism to release the pressurized fluid into the enclosed cavity.

13. A fire ant control apparatus comprising:
   a container of pressurized fluid formulated to eliminate fire ants, the container having a spray release mechanism including a nozzle for releasing the pressurized fluid; and
   a housing having an open end and an inside surface defining an open interior cavity, the open end having an outer edge for contacting an outside surface of an ant hill with at least one fire ant entrance through which a fire ant may pass to enter or exit subterranean tunnels beneath the outside surface of the ant hill, the inside surface of the housing and the outside surface of the ant hill forming a closed interior cavity adjacent the outside surface of the ant hill, the housing being operatively associated with an activation mechanism for activating the spray release mechanism, the nozzle being positioned within the closed interior cavity, allowing the pressurized fluid to be released within the closed interior cavity, pass through the at least one fire ant entrance and infuse the subterranean tunnels.

14. A pest control apparatus comprising:
   a conventional fogger canister for the dispersion of pesticide vapor, the canister having a spray release mechanism including a nozzle for releasing the pesticide vapor;
   a housing defining an open interior cavity, the housing including:
      an inside surface;
      open end having an outer edge for contacting a surface surrounding a pest dwelling, the surrounding surface having at least one pest entrance through which a pest may pass to enter or exit the dwelling, the inside surface of the housing and the surrounding surface forming a closed interior cavity adjacent the surrounding surface;
      a first section housing including a first section opening edge, the first section opening edge spaced apart from the open end of the housing
      a second section housing including a second section opening edge, the second section opening edge spaced apart from the open end of the housing;
      a first section flexible sealing member adjacent the first section opening edge;
      a second section flexible sealing member adjacent the second section opening edge;
      a sealable access aperture in spaced relation to the spray release mechanism, so that the spray release mechanism can be operatively engaged through the access aperture and caused to release the pressurized fluid within the closed interior cavity; and
      at least one removable section for providing at least one closeable opening in the housing, the at least one closeable opening including a closeable opening edge defining the at least one closeable opening, to allow the closeable opening edge to be disposed against the surface of a perimeter obstruction, thereby causing the pest entrances to be disposed within the closed interior cavity, and thereby causing the pressurized fluid to be prevented from or delayed in passing through the at least one closeable opening in the housing; and
   at least one fluid guide adjacent and connected to the inside surface of the housing, the at least one fluid guide comprising an elongated enclosure forming a fluid guide cavity open at a first end and at a second end, the first end spaced apart from the nozzle of the spray release mechanism and the second end positioned between the first end and the surface containing the pest entrances, whereby the at least one fluid guide allows the pressurized fluid to flow through the fluid guide cavity in the direction of the surface containing the pest entrances;
   wherein the first section housing and the second section housing are separable for positioning around an interior obstruction extending upwardly from the dwelling surface, the first section flexible sealing member being adapted to abut and sealably engage a first outside surface of the interior obstruction, the second section flexible sealing member being adapted to abut and sealably engage a second outside surface of the interior obstruction, to thereby prevent the pressurized fluid from escaping the closed interior cavity.

15. A method of controlling pests comprising the following steps:
   (a) placing a container of pressurized fluid formulated to eliminate pests on a surface surrounding a pest dwelling, the dwelling having at least one entrance through which a pest may pass to enter or exit the dwelling, the container having a spray release mechanism including a nozzle for releasing the pressurized fluid;
   (b) placing a housing including an open end, the open end having an outer edge, over the surrounding surface, whereby the outer edge contacts the dwelling surface, the housing and the dwelling surface, thereby forming a closed interior cavity adjacent the dwelling surface and enclosing the container therein, the housing having an activation mechanism for the activation of the spray release mechanism; and
   (c) activating the activation mechanism, causing the pressurized fluid to be released within the closed interior cavity and to pass through the pest entrances, infusing the dwelling.

16. The method according to claim 15 wherein the container of pressurized fluid comprises a conventional fogger canister for the dispersion of pesticide vapor.

17. The method according to claim 15 wherein the container of pressurized fluid comprises a conventional spray can for the dispersion of pesticide liquid.

18. The method according to claim 15 wherein step (c) comprises the step of operatively engaging the spray release mechanism and causing the spray release mechanism to release the pressurized fluid within the closed interior cavity, wherein the spray release mechanism is operatively engaged through a sealable access aperture in the housing that is located in a predetermined position in spaced relation to the spray release mechanism.

19. The method according to claim 15 wherein step (c) comprises the step of operatively engaging the spray release mechanism and causing the spray release mechanism to release the pressurized fluid within the closed interior cavity, wherein the spray release mechanism is operatively engaged by a plunger member that is slidably inserted into a plunger aperture in the housing.

20. The method according to claim 15 wherein:
the housing also comprises:
   a first section housing including a first section opening edge, the first section opening edge spaced apart from the open end of the housing;
   a second section housing including a second section opening edge, the second section opening edge spaced apart from the open end of the housing;
   a first section flexible sealing member adjacent the first section opening edge; and
   a second section flexible sealing member adjacent the second section opening edge;
   wherein the first section housing and the second section housing are separable for positioning around an interior obstruction extending upwardly from the dwelling surface, the first section flexible sealing member being adapted to abut and sealably engage a first outside surface of the interior obstruction, the second section flexible sealing member being adapted to abut and sealably engage a second outside surface of the interior obstruction; and
step (b) comprises the following steps:
   (a) positioning the first section housing and the second section housing so that an interior obstruction extending upwardly from the dwelling surface is located in a space between the first section housing and the second section housing;
   (b) aligning and sealably engaging the first section housing and the second section housing, whereby the interior obstruction projects upwardly from the surface containing the dwelling surface through an upper surface opening defined by the first opening edge and the second opening edge, the first section flexible sealing member sealably engaging a first outside surface of the interior obstruction and the second flexible sealing member sealably engaging a second outside surface of the interior obstruction, thereby sealably filling the upper surface opening and preventing the pressurized fluid from escaping the closed interior cavity through the upper surface opening.

21. The method according to claim 15 wherein at least one fluid guide is adjacent and connected to the inside surface of the housing, the at least one fluid guide comprising an elongated enclosure forming a fluid guide cavity open at a first end and at a second end, the first end spaced apart from the nozzle of the spray release mechanism and the second end positioned between the first end and the surface containing the pest entrances, whereby the at least one fluid guide allows the pressurized fluid to flow through the fluid guide cavity in the direction of the surface containing the pest entrances.

22. The method according to claim 15 wherein step (b) comprises the following steps:
   (a) providing a housing having removable sections, an open end and an inside surface and defining an open interior cavity, the open end having an outer edge for contacting the dwelling surface, the housing and the dwelling surface thereby forming a closed interior cavity adjacent the dwelling surface, the housing having an activation mechanism for the activation of the spray release mechanism, the nozzle being positioned within the closed interior cavity;
   (b) removing at least one removable section from the housing, thereby providing at least one closable opening in the housing, the at least one closeable opening including a closeable opening edge defining the at least one closeable opening;
   (c) disposing the opening edge of the at least one closeable opening against the surface of a perimeter obstruction in a predetermined position, thereby causing the pest entrances to be disposed within the closed interior cavity.

23. The method according to claim 15 wherein the housing comprises a conventional bucket.

24. A method of controlling pests comprising the following steps:
   (a) placing a container of pressurized fluid formulated to eliminate fire ants on a surrounding surface of an ant hill, the ant hill having at least one entrance through which a fire ant may pass to enter or exit the ant hill, the container having a spray release mechanism including a nozzle for releasing the pressurized fluid;
   (b) placing a housing including an open end, the open end having an outer edge, over the surrounding surface, whereby the outer edge contacts the dwelling surface, the housing and the dwelling surface, thereby forming a closed interior cavity adjacent the surrounding surface and enclosing the container therein, the housing having an activation mechanism for the activation of the spray release mechanism; and
   (c) activating the activation mechanism, causing the pressurized fluid to be released within the closed interior cavity and to pass through the at least one fire ant entrance, infusing the subterranean tunnels beneath the surrounding surface.

25. A method of controlling pests comprising the following steps:
   (a) placing a housing over the outside surface of a pest dwelling containing at least one entrance through which a pest may pass to enter or exit the dwelling, thereby forming a closed interior cavity adjacent the dwelling surface, the housing having an inside surface, a container aperture and a lever mechanism within the closed interior cavity of the housing, the lever mechanism connected at one end to the inside surface of the housing and extending inwardly from the inside surface of the housing;
   (b) slidably inserting a container of pressurized fluid formulated to eliminate pests into the container aperture, the container having a spray release mechanism including a nozzle for releasing the pressurized fluid, and thereby positioning the container in the container aperture and the nozzle of the spray release mechanism in the closed interior cavity;

(c) operatively engaging the spray release mechanism with the lever mechanism, thereby causing the nozzle of the spray release mechanism to release the pressurized fluid into the closed interior cavity and to pass through the pest entrances, infusing the dwelling.

26. A method of controlling pests comprising the following steps:

(a) providing a container of pressurized fluid formulated to eliminate pests, the container having a spray release mechanism including a nozzle for releasing the pressurized fluid;

(b) providing a housing having an open end and an inside surface and defining an open interior cavity, the open end having an outer edge for contacting a surface surrounding a pest dwelling, the surrounding surface containing at least one pest entrance through a pest may pass to enter or exit the dwelling, and for forming a closed interior cavity adjacent the dwelling surface, the housing having an activation mechanism for the activation of the spray release mechanism;

(c) placing on the dwelling surface a container positioning member including a guide member and a container holder connected to the guide member;

(d) placing the container of pressurized fluid in the container holder;

(e) removably connecting to the housing a trigger mechanism including an attachment member and a cantilever member connected to the attachment member, the cantilever member having a through bore including an axis alignable with the axis of the guide member;

(f) slidably inserting the guide member into the through bore of the cantilever member;

(g) moving the cantilever member parallel with the axis of the guide member and operatively engaging the spray release mechanism as the housing is moved toward the dwelling surface, thereby allowing the outer edge of the housing to contact the dwelling surface, forming the closed interior cavity and causing the nozzle of the spray release mechanism to release the pressurized fluid into the enclosed cavity, thereby infusing the dwelling.

27. A method of controlling pests comprising the following steps:

(a) placing a conventional fogger canister for the dispersion of pesticide vapor on a surface surrounding a pest dwelling, the dwelling containing at least one pest entrance through which a pest may enter or exit the dwelling, the fogger cannister having a spray release mechanism including a nozzle for releasing the pesticide vapor;

(b) providing a housing defining an open interior cavity, the housing including:
an inside surface;
an open end having an outer edge for contacting the surface of the pest dwelling and for forming a closed interior cavity adjacent the dwelling surface;

a first section housing including a first section opening edge, the first section opening edge spaced apart from the open end of the housing;

a second section housing including a second section opening edge, the second section opening edge spaced apart from the open end of the housing;

a first section flexible sealing member adjacent the first section opening edge; and a second section flexible sealing member adjacent the second section opening edge;

a sealable access aperture in spaced relation to the spray release mechanism; and at least one removable section for providing at least one closeable opening in the housing, the at least one closeable opening including a closeable opening edge defining the at least one closeable opening;

(c) providing at least one fluid guide adjacent and connected to the inside surface of the housing, the at least one fluid guide comprising an elongated enclosure forming a fluid guide cavity, the fluid guide cavity open at a first end and at a second end, the first end spaced apart from the nozzle of the spray release mechanism and the second end positioned between the first end and the surface containing the pest entrances, whereby the at least one fluid guide allows pressurized fluid released within the closed interior cavity to flow through the fluid guide cavity in the direction of the pest dwelling;

(d) positioning the first section housing and the second section housing so that an interior obstruction extending upwardly from the dwelling surface is located in a space between the first section housing and the second section housing;

(e) aligning and sealably engaging the first section housing and the second section housing, thereby allowing the interior obstruction to project upwardly through an upper surface opening defined by the first opening edge and the second opening edge, causing the first section flexible sealing member to sealably engage a first outside surface of the interior obstruction, and causing the second flexible sealing member to sealably engage a second outside surface of the interior obstruction, thereby sealably filling the upper surface opening and preventing the pressurized fluid from escaping the closed interior cavity through the upper surface opening;

(f) disposing the opening edge of the at least one closeable opening against the surface of a perimeter obstruction in a predetermined position, thereby causing the pest entrances to be disposed within the closed interior cavity; and (g) operatively engaging the spray release mechanism through the sealable access aperture and causing the spray release mechanism to release the pressurized fluid within the closed interior cavity.

* * * * *